United States Patent

Ishii et al.

[11] Patent Number: 6,069,736
[45] Date of Patent: May 30, 2000

[54] ANTI-VIBRATION LENS ATTACHMENT

[75] Inventors: Shinichiro Ishii; Takayuki Ito, both of Saitama, Japan

[73] Assignee: Asahi Kogaku Kogyo Kabushiki Kaisha, Tokyo, Japan

[21] Appl. No.: 09/188,305

[22] Filed: Nov. 10, 1998

[30] Foreign Application Priority Data

Nov. 11, 1997  [JP]  Japan ................................. 9-308690

[51] Int. Cl.[7] .......................... G02B 27/64; G02B 23/00
[52] U.S. Cl. ......................... 359/557; 359/434; 359/554
[58] Field of Search .................. 359/554–557, 359/422–423, 431–435, 675–677; 396/52–55; 348/208

[56] References Cited

U.S. PATENT DOCUMENTS

| | | | |
|---|---|---|---|
| 4,867,549 | 9/1989 | Sekine | 359/431 |
| 5,124,837 | 6/1992 | Ono | 359/434 |
| 5,172,268 | 12/1992 | Kikuchi | 359/557 |
| 5,280,387 | 1/1994 | Maruyama | 359/557 |
| 5,331,467 | 7/1994 | Sato | 359/557 |
| 5,461,413 | 10/1995 | Maruyama | 359/557 |
| 5,499,069 | 3/1996 | Griffith | 359/675 |
| 5,701,205 | 12/1997 | Hasushita et al. | 359/557 |
| 5,703,716 | 12/1997 | Furuta | 359/431 |

FOREIGN PATENT DOCUMENTS 9-236744  9/1997  Japan .

OTHER PUBLICATIONS

English–language Abstract of JP–9–236744.

*Primary Examiner*—Thong Nguyen
*Attorney, Agent, or Firm*—Greenblum & Bernstein, P.L.C.

[57] ABSTRACT

An anti-vibration lens attachment which is detachably attached to and between a photographing lens and a camera body includes an anti-vibration lens system having at least one correction lens group which is movable in a direction perpendicular to the optical axis, wherein an image formed by the photographing lens system is inverted at least once and is formed again on an image forming surface of the camera body by the anti-vibration lens system. The anti-vibration lens system includes at least six positive lens elements and at least two negative lens elements.

20 Claims, 12 Drawing Sheets

SPHERICAL ABERRATION
THE SINE CONDITION

LATERAL CHROMATIC ABERRATION

ASTIGMATISM

DISTORTION

SPHERICAL ABERRATION
THE SINE CONDITION

FIG. 7B

LATERAL CHROMATIC ABERRATION

FIG. 7C

ASTIGMATISM

FIG. 7D

DISTORTION

SPHERICAL ABERRATION
THE SINE CONDITION

FIG. 13B

LATERAL CHROMATIC ABERRATION

FIG. 13C

ASTIGMATISM

FIG. 13D

DISTORTION

-0.2  0.2
SPHERICAL
ABERRATION

THE SINE
CONDITION

——— d LINE
------ g LINE
— — c LINE

-0.01  0.01
LATERAL
CHROMATIC
ABERRATION

-0.2  0.2
ASTIGMATISM

-1.0 % 1.0
DISTORTION

FIG. 17

ANTI-VIBRATION LENS ATTACHMENT

BACKGROUND OF THE INVENTION

1. Field of the Invention

The present invention relates to an anti-vibration lens attachment which can be used with, for example, a CCTV (monitoring camera).

2. Description of the Related Art

There two known types of anti-vibration lenses which absorb vibration applied to a photographing lens system and form an image on an image forming surface (image pickup surface) of a camera body; i.e., an integrated anti-vibration lens which includes a correction lens group made integral with the photographing lens system (master lens), the lens being movable in a direction perpendicular to the optical axis direction, and an attachment type in which an anti-vibration lens system including a correction lens group is supported on an attachment which is detachably inserted between the photographing lens system and the camera body. In either type, vibration applied to the camera body is detected so that the correction lens group is moved in a direction perpendicular to the optical axis in accordance with the magnitude and the direction of the vibration to eliminate an image blur on the image forming surface. There are known various types of vibration detection devices and drive mechanisms for anti-vibration lenses.

In attachment type anti-vibration lenses, the anti-vibration lens system is arranged between the photographing lens system (master lens) and the image surface thereof in the camera body. Namely, the anti-vibration lens system is located in front of a position in which the image is formed by the photographing lens system, so that the image forming position is shifted rearward by a displacement corresponding to the thickness of the attachment (distance between mounts which are provided at the front and rear ends of the attachment to connect the same to a photographing lens and a camera body) to thereby form an image on an image forming surface of the camera body.

It is desirable that no substantial change in the focal length of the master lens is caused by the anti-vibration lens attachment (i.e., the magnification is approximately 1). However, if the magnification is approximately equal to 1, it is difficult to obtain a sufficient thickness of the attachment. Consequently, it is difficult to construct an anti-vibration lens system whose number of lens elements are enough to correct aberrations.

SUMMARY OF THE INVENTION

It is an object of the present invention to provide an anti-vibration lens attachment with an increased freedom of design of the anti-vibration lens system and exhibiting good optical properties; and furthermore, an anti-vibration lens system in which the magnification can be optionally set.

According to the basic concept of the present invention, light which carries an image formed by the photographing lens system is imaged once, and is then relayed to an image forming surface of the camera body by the anti-vibration lens system, so that the magnification can be optionally set and the thickness of the attachment can be increased. Thus, lens elements whose number is enough to enhance optical properties can be accommodated in the attachment.

Namely, according to an aspect of the present invention, there is provided an anti-vibration lens attachment which can be detachably attached to and between a photographing lens and a camera body, and includes an anti-vibration lens system having at least one correction lens group which is movable in a direction perpendicular to the optical axis, wherein an image formed by the photographing lens system is inverted at least once and is formed again on an image forming surface of the camera body by the anti-vibration lens system. The anti-vibration lens system has at least six positive lens elements and at least two negative lens elements.

The (at least) six positive lens elements are preferably made of a material of high refractive index, so that the mean value of the refractive indexes thereof is larger than 1.65.

Preferably, the (at least) six positive lens elements and the (at least) two negative lens elements are divided into front and rear lens groups at a portion in which the inclination of paraxial rays with respect to the optical axis is minimal. The front lens group and the rear lens group preferably include at least three positive lens elements and at least one negative lens element, respectively.

The lens group located closest to the photographing lens system in the front lens group can constitute the correction lens group. Alternatively, the lens group located closest to the photographing lens system in the rear lens group can constitute the correction lens group. It is preferable that aberrations be independently corrected by the front lens group and the rear lens group.

Preferably, the sensitivity of the correction lens group in the anti-vibration lens system satisfies the following condition: $0.2 < |K| < 0.8$; wherein K=(displacement of the image formed through the anti-vibration lens system on the image forming surface)/(displacement of the correction lens group in a direction perpendicular to the optical axis).

Preferably, the anti-vibration lens system includes at least seven positive lens elements and at least three negative lens elements. Preferably, at least three lens elements of the seven positive lens elements have a refractive index greater than 1.7. Alternatively, the anti-vibration lens attachment includes at least two lens elements whose refractive index "n" and dispersive power "v" are greater than 1.6 (n>1.6) and 60 (v>60), respectively.

The (at least) seven positive lens elements and the (at least) three negative lens elements can be divided into front and rear lens groups at a portion in which the inclination of paraxial rays with respect to the optical axis is minimal. The front lens group can be composed of at least four positive lens elements and at least two negative lens elements. The rear lens group can be composed of at least three positive lens elements and at least one negative lens element.

The lens group located closest to the photographing lens system in the front lens group can constitute the correction lens group. Alternatively, the lens group located closest to the photographing lens system in the rear lens group can constitute the correction lens group.

It is preferable that aberrations be independently corrected by the front lens group and the rear lens group.

The sensitivity K of the correction lens group belonging to the anti-vibration lens system preferably satisfies the following condition: $0.2 < |K| < 0.83$; wherein K=(displacement of the image formed through the anti-vibration lens system on the image forming surface)/(displacement of the correction lens group in a direction perpendicular to the optical axis).

The correction lens group can be made of a plastic lens to reduce the weight thereof.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
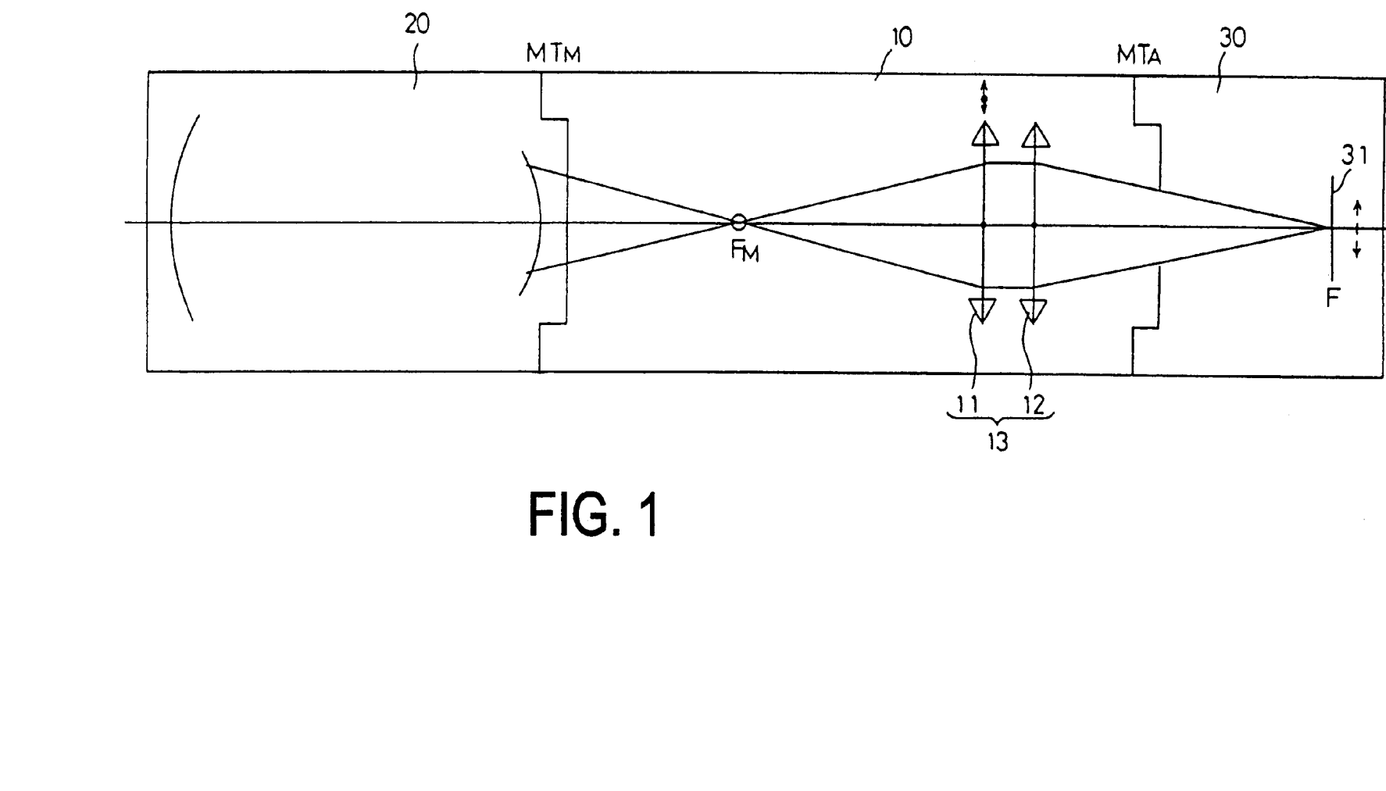
FIG. 1 is a conceptual view of an anti-vibration lens attachment inserted between a photographing lens and a camera body, according to an embodiment of the present invention.

In FIG. 1, an anti-vibration lens attachment 10 is inserted between a photographing lens system (master lens) 20 and a CCTV camera body 30. The anti-vibration lens attachment 10 is provided on its front end with a lens mount MTM to which the photographing lens system 20 is mounted, and on its rear end with a body mount MTA to which the camera body is mounted.

The anti-vibration lens attachment 10 is provided therein with an anti-vibration lens system (relay lens system) 13 which is located behind an image forming position FM at which an image by the master lens 20 is formed. The anti-vibration lens system 13 is comprised of a correction lens group 11 which is movable in a direction perpendicular to the optical axis and an immovable lens group 12. The anti-vibration lens system 13 re-forms (or relays) an image formed at the image forming position FM by the master lens 20 on an image forming surface (CCD) 31 of the camera body 30. The anti-vibration lens system 13 can be made of an afocal lens system or can have either positive or negative power as a whole. In view of a mechanical structure, it is preferable that the correction lens group be light in weight. To this end, the anti-vibration lens system 13 is preferably composed of the movable correction lens group 11 and the immovable lens group 12, as mentioned above. Alternatively, the anti-vibration lens system 13 can be entirely composed of the correction lens group 11 which is movable in a direction perpendicular to the optical axis. The order of the arrangement of the movable leans group 11 and the stationary lens group 12 can be opposite to that shown in FIG. 1.

Figure 2:
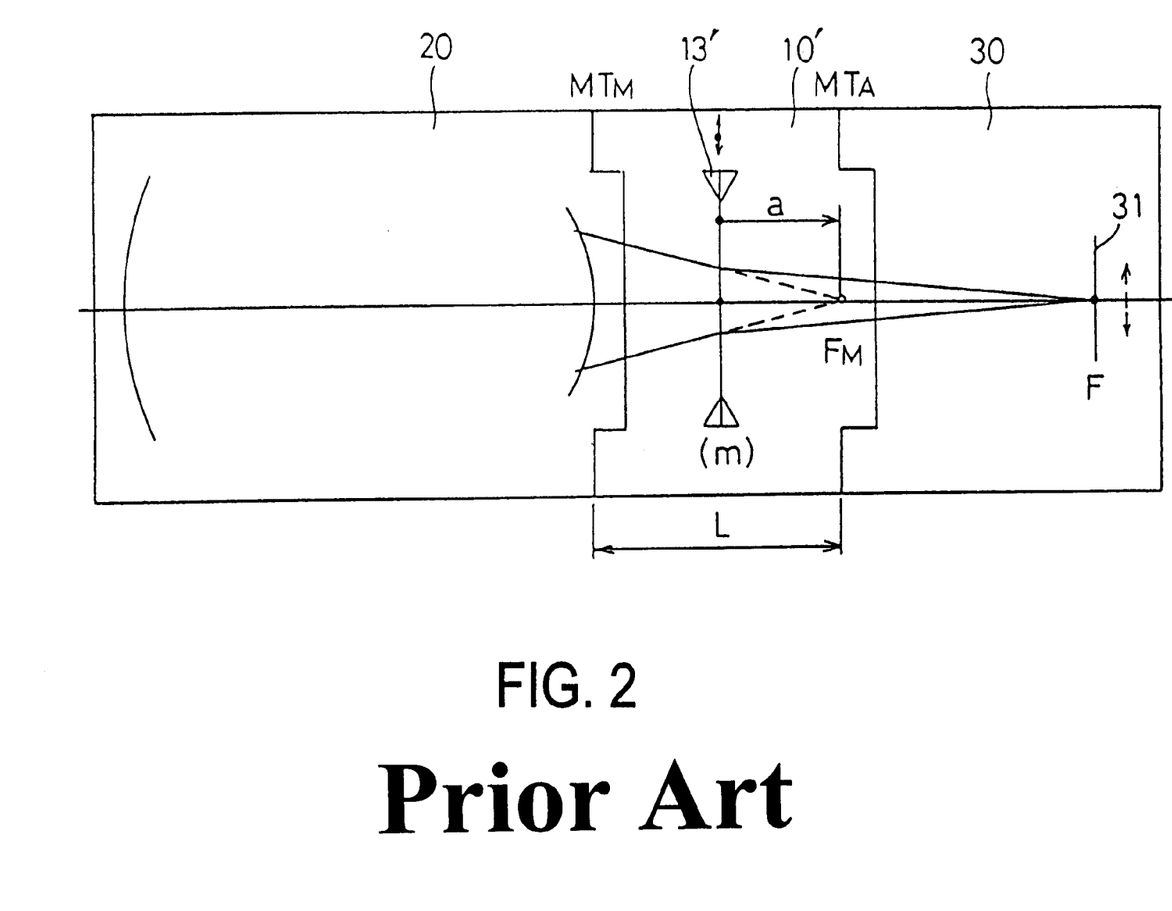
FIG. 2 is a conceptual view of a known anti-vibration lens attachment, corresponding to FIG. 1 as a comparison.

FIG. 2 shows a known anti-vibration lens attachment 10' in which the anti-vibration lens system 13' is inserted between the master lens 20 and the image forming position FM of the master lens 20, for the sake of comparison. In the prior art shown in FIG. 2, the image forming position of the master lens 20 is shifted rearward by an amount corresponding to the thickness of the anti-vibration lens attachment 10'. However, there is a limitation on the rearward shift of the image forming position and hence, it is difficult to increase the thickness of the anti-vibration lens attachment 10' (distance between the lens mount and the body mount). Namely, the distance L between the mounts is represented by:

$$L=(m-1)a+\Delta$$

wherein 'm' represents the magnification, 'a' represents the distance between the first principal point of the attachment and the image surface of the master lens, and Δ represents the distance between the principal points of the anti-vibration lens system 13'. On the assumption that the right direction in FIG. 2 is represented by (+), a>0, and m>0. Consequently, in the prior art, if the magnification is approximately equal to 1 (i.e., m≈−1), since the distance Δ between the principal points of the anti-vibration lens system 13' is small, it is difficult to increase the thickness of the anti-vibration lens attachment.

In the anti-vibration attachment lens shown in FIG. 1 in which the correction lens group is located on the right side of the image forming point, and hence the image is inverted, i.e., a<0, m<0, since the anti-vibration lens system 13 relays the image formed at the images forming position FM by the master lens 20 to the image forming surface 31 of the camera body 30, the thickness of the anti-vibration lens attachment 10 (length in the optical axis direction) can be easily increased. Consequently, not only can freedom of design of the lens structure of the anti-vibration lens attachment 13 be enhanced but also the drive mechanism for driving the correction lens group 11 can be easily accommodated. The assignee of the present application filed another application for the anti-vibration lens attachment (U.S. patent application Ser. No. 09/138,373).

One of the significant features of the present invention resides in an arrangement of the anti-vibration lens attachment 10 constructed as above. The anti-vibration lens system 13 includes six or more positive lens elements and two or more negative lens elements.

The anti-vibration lens attachment 13 includes a relay lens system which re-forms an image of a master lens (photographing lens system) 20 onto the image forming surface 31 of the camera body 30. In this relay lens system, it is preferable that lens groups, having strong positive power, be used in combination in order to relay (propagate)

the pupil of the master lens 20. However, a lens which has strong positive power increases the Petzval sum. To compensate this, it is necessary to use a lens having strong negative power. Also, it is desirable that the number of lens elements of which the positive lens is made be increased to correct aberrations caused by an increase in the Petzval sum.

The condition that at least six positive lens elements and at least two negative lens elements are used in the anti-vibration lens system according to the present invention meets the requirements of the relay lens system mentioned above. If the number of the positive lens elements is less than six or the number of the negative lens elements is less than two, it is difficult to reduce the Petzval sum, and thereby making it difficult to effectively compensate aberrations. More preferably, seven or more positive lens elements and three or more negative lens elements are used.

To reduce the petzval sum, it is preferable that the positive lens be made of a glass lens having a high refractive index. Namely, preferably, the mean value Np of the refractive index of the positive lenses satisfies the following relationship:

$1.65 < Np.$

If more than six positive lens elements are used, at least three of them are preferably made of a material whose refractive index is greater than 1.7.

Preferably, at least six positive lens elements and at least two negative lens elements are divided into two groups, i.e., a front lens group and a rear lens group, at a portion in which the inclination of paraxial rays with respect to the optical axis is minimal. The front lens group includes at least four positive lens elements and at least two negative lens elements and the rear lens group includes at least three positive lens elements and at least one negative lens element. With this arrangement, the Petzval sum can be reduced and the aberrations can be effectively compensated, in both the front lens group and the rear lens group, respectively.

Namely, the aberrations are independently corrected by the front lens group and the rear lens group. If the inclination of the paraxial rays between the front and rear lens groups is minimized (approximately 0) and the aberrations are corrected individually by the front and rear lens groups, little deterioration of optical properties occur due to manufacturing error, such as failure to align the optical axes of the front and rear lens groups. Moreover, if the specification of the lens system, such as magnification, is changed, it is possible to meet the new specification by modifying only one of the front and rear lens groups.

In the relay lens system, since the chromatic aberration of the master lens is also relayed (propagated), the axial chromatic aberration tends to increase. Moreover, if the relay lens system is commonly applied to a plurality of master lenses, since the chromatic aberrations of the respective master lenses are different, it is advisable to fully compensate the chromatic aberrations solely by the relay lens system (anti-vibration lens attachment). To this end, it is preferable that a glass having high refractive index and low dispersive power be used. Namely, preferably at least two lens elements whose refractive index "n" and dispersive power "v" satisfy the following relationship are used:

$n > 1.6, v > 60.$

Furthermore, it is preferable that the sensitivity of the correction lens group in the anti-vibration lens system be reduced and the displacement of the lens group be increased in order to enhance the reliability of the anti-vibration lens system. Namely, vibration can be compensated by the increased displacement of the correction lens group. Preferably, the sensitivity K of the correction lens group belonging to the anti-vibration lens system satisfies the following relationship:

$0.2 < |K| < 0.8$ wherein the sensitivity K is represented by (displacement of the image formed on the image forming surface through the anti-vibration lens system)/(displacement of the correction lens group in a direction perpendicular to the optical axis).

Preferably, the correction lens group is made of a plastic lens to reduce the weight thereof.

Numerical examples (embodiments) of the present invention will be discussed below. The master lens 20 used in the five embodiments is identical and the numerical data thereof is shown in Table 1 below.

In the aberration diagrams for the respective embodiments, SA represents the spherical aberration; SC represents the sine condition; the d-line, the g-line, and the c-line represent the lateral chromatic aberrations represented by the spherical aberrations, at the respective wavelengths; S represents the sagittal rays; and M represents the meridional rays. Also, in the tables and drawings, $F_{NO}$ designates the F-number; f the focal length; W the half angle of view; M the lateral magnification; fB the back focal distance; R the radius of curvature of each lens surface; D the distance between the lenses or the lens thickness; Nd the refractive index; and, vd the Abbe number, respectively.

TABLE 1

| $F_{NO}$ = 1:1.6 | f = 12.02 | W = 22.2 | fB = 19.82 | |
|---|---|---|---|---|
| Surface No. | R | D | Nd | vd |
| 1 | 150.760 | 2.800 | 1.80518 | 25.4 |
| 2 | 87.610 | 14.500 | 1.61800 | 63.4 |
| 3 | −685.601 | 0.200 | — | — |
| 4 | 92.459 | 8.000 | 1.49700 | 81.6 |
| 5 | 247.372 | 2.000 | — | — |
| 6 | 345.600 | 2.000 | 1.61800 | 63.4 |
| 7 | 51.954 | 4.800 | — | — |
| 8 | ∞ | 6.000 | 1.84666 | 23.8 |
| 9 | −76.291 | 2.000 | 1.72000 | 43.7 |
| 10 | −152.991 | 2.000 | — | — |
| 11 | −65.500 | 1.800 | 1.72916 | 54.7 |
| 12 | 82.000 | 63.375 | — | — |
| 13 | −68.000 | 1.600 | 1.61772 | 49.8 |
| 14 | 17.416 | 2.900 | 1.80518 | 25.4 |
| 15 | 35.459 | 41.425 | — | — |
| 16 | ∞ | 0.500 | 1.51633 | 64.1 |
| 17 | ∞ | 1.000 | — | — |
| Diaphragm | ∞ | 3.000 | — | — |
| 18 | 123.000 | 3.500 | 1.80400 | 46.6 |
| 19 | −123.000 | 0.100 | — | — |
| 20 | 99.000 | 3.300 | 1.69680 | 55.5 |
| 21 | −1154.546 | 0.100 | — | — |
| 22 | 61.697 | 7.000 | 1.48749 | 70.2 |
| 23 | −51.212 | 1.500 | 1.80518 | 25.4 |
| 24 | 200.755 | 0.100 | — | — |
| 25 | 26.525 | 4.800 | 1.49700 | 81.6 |
| 26 | 61.254 | 13.300 | — | — |
| 27 | 20.675 | 2.400 | 1.74950 | 35.3 |
| 28 | 14.000 | 11.000 | — | — |
| 29 | 27.915 | 3.700 | 1.51633 | 64.1 |
| 30 | −98.790 | — | — | — |

<Embodiment 1>

Figure 3:
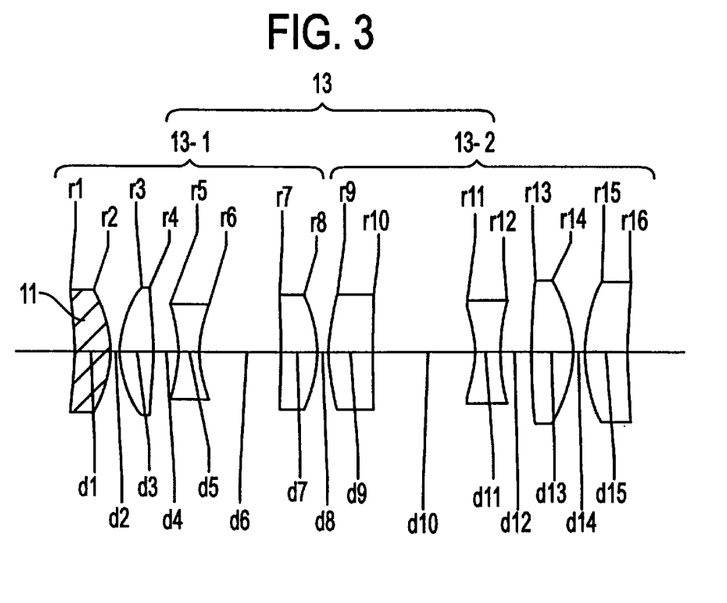
FIG. 3 is a schematic view of a lens arrangement of an anti-vibration lens attachment according to a first embodiment of the present invention.
Figure 4A:
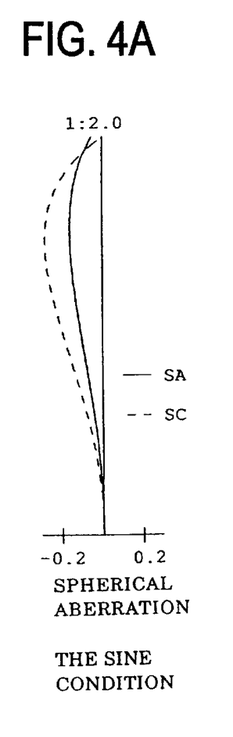
FIGS. 4A, 4B, 4C and 4D show aberration diagrams of the lens system shown in FIG. 3.
Figures 4B, 4C, 4D:
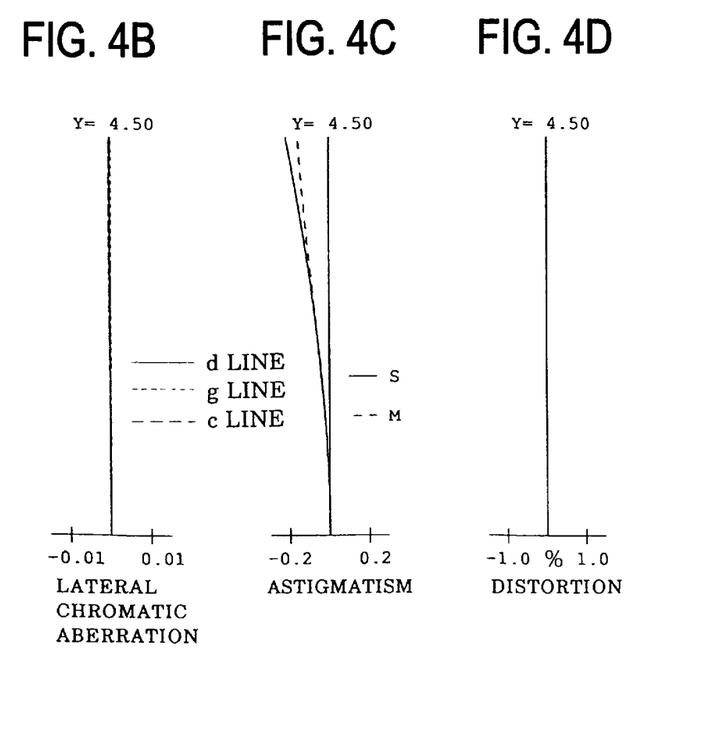
Figure 5:
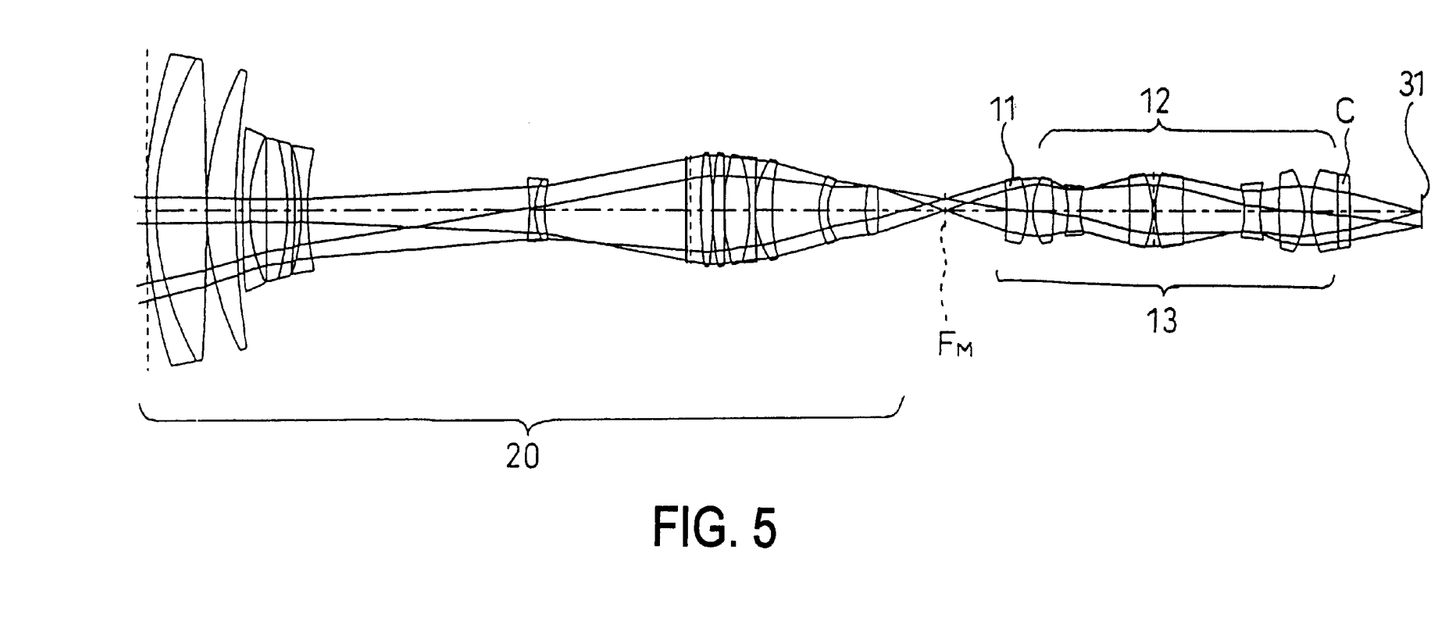
FIG. 5 is a schematic view of an entire lens system including a vibration lens attachment shown in FIG. 3 and a master lens, in combination.

FIG. 3 shows a lens arrangement of a first embodiment of an anti-vibration system 13 of an anti-vibration lens attachment according to the present invention. FIGS. 4A through 4D show aberration diagrams of the anti-vibration lens system 13 shown in FIG. 3; and FIG. 5 is a schematic view of a whole lens system in which the anti-vibration lens system 13 shown in FIG. 3 is combined with the master lens 20. Table 2 below shows numerical data of the anti vibration lens system 13 shown in FIG. 3. The glass cover C of the CCD 31 in FIG. 5 is not shown in FIG. 3, but the surface Nos. 17 and 18 in Table 2 correspond to the opposite surfaces of the glass cover C.

The anti-vibration lens system 13 in the first embodiment includes six positive lens elements and two negative lens elements. These lens elements are divided into two lens groups; i.e., a front lens group 13-1 and a rear lens group 13-2 at a portion in which the inclination of the paraxial rays with respect to the optical axis is minimal. The front lens group 13-1 and the rear lens group 13-2 each have three positive lens elements and one negative lens element. The frontmost lens closest to the object (master lens 20), hatched in FIG. 3 defines a correction lens group 11 which is movable in a direction perpendicular to the optical axis. The mean refractive index of the positive lens elements is 1.73983. The six positive lens elements have a refractive index greater than 1.7. There are no lenses used whose refractive index "n" is greater than 1.6 or whose Abbe number ν is greater than 60. The sensitivity K of the correction lens group 11 is 0.74.

TABLE 2

| $F_{NO} = 1:2.0$ | f = −46.53 | m = −1.250 | fB = 15.19 |
|---|---|---|---|
| Surface No. | R | D | Nd | νd |
| 1 | −83.104 | 6.000 | 1.77250 | 49.6 |
| 2 | −22.421 | 1.685 | — | — |
| 3 | 18.093 | 5.828 | 1.71300 | 53.9 |
| 4 | −96.384 | 4.380 | — | — |
| 5 | −25.186 | 3.500 | 1.84666 | 23.8 |
| 6 | 18.778 | 14.307 | — | — |
| 7 | −188.045 | 6.300 | 1.73400 | 51.5 |
| 8 | −26.489 | 2.000 | — | — |
| 9 | 33.111 | 7.875 | 1.73400 | 51.5 |
| 10 | 235.056 | 17.884 | — | — |
| 11 | −23.472 | 4.375 | 1.84666 | 23.8 |
| 12 | 31.483 | 5.475 | — | — |
| 13 | 120.480 | 7.285 | 1.71300 | 53.9 |
| 14 | −22.616 | 2.106 | — | — |
| 15 | 28.026 | 7.500 | 1.77250 | 49.6 |
| 16 | 103.880 | 5.000 | — | — |
| 17 | ∞ | 3.500 | 1.51633 | 64.1 |
| 18 | ∞ | — | — | — |

<Embodiment 2>

Figure 6:
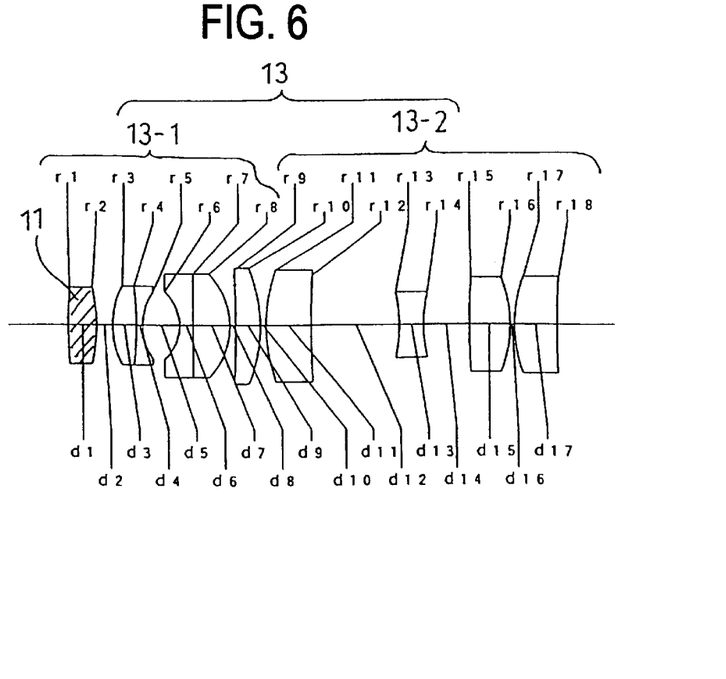
FIG. 6 is a schematic view of a lens arrangement of an anti-vibration lens attachment according to a second embodiment of the present invention.
Figure 7A:
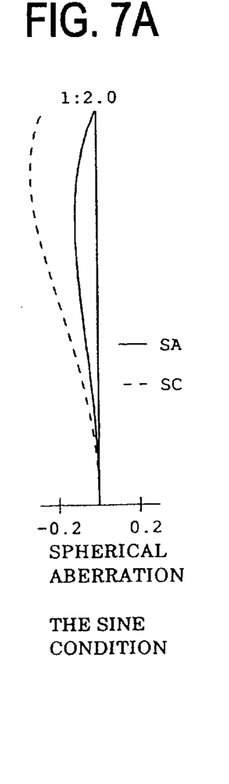
FIGS. 7A, 7B, 7C and 7D show aberration diagrams of the lens system shown in FIG. 6.
Figure 7B:
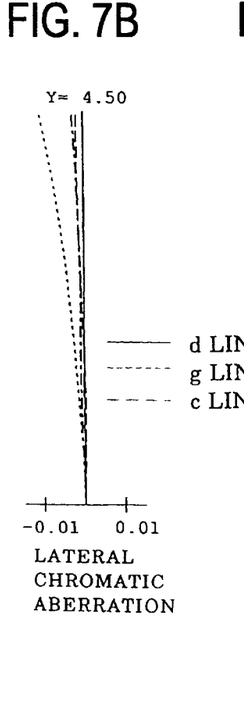
Figure 7C:
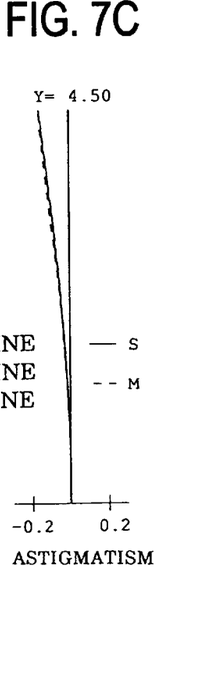
Figure 7D:
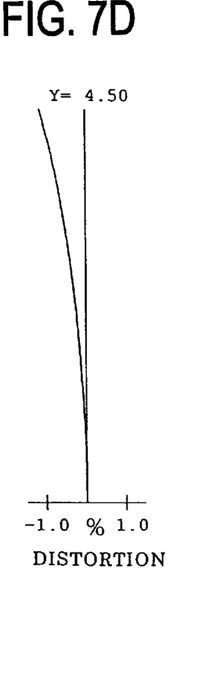
Figure 8:
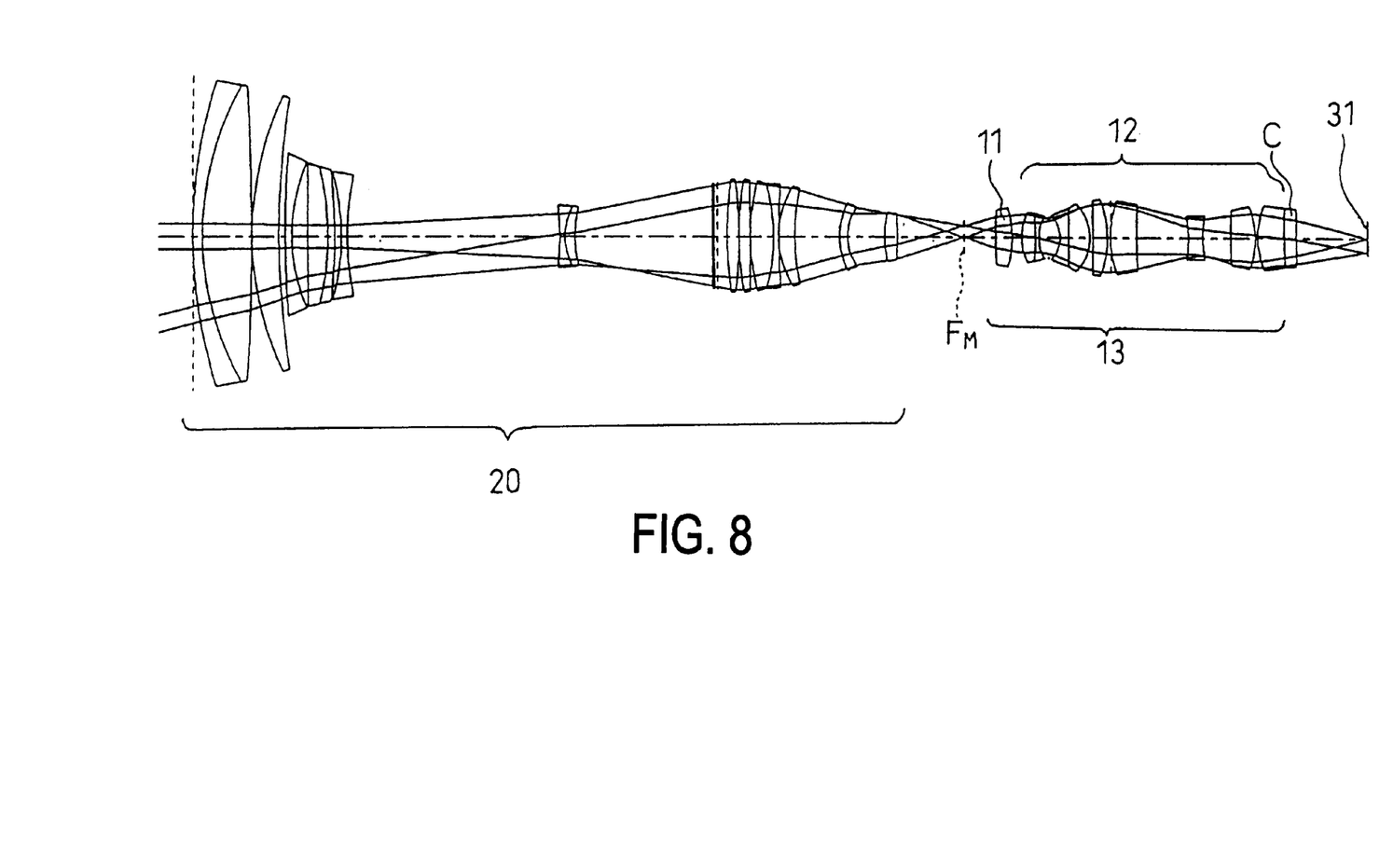
FIG. 8 is a schematic view of an entire lens system including a vibration lens attachment shown in FIG. 6 and a master lens, in combination.

FIG. 6 shows a lens arrangement of a second embodiment of an anti-vibration system 13 of an anti-vibration lens attachment according to the present invention. FIGS. 7A through 7D show aberration diagrams of the anti-vibration lens system 13 shown in FIG. 6; and FIG. 8 is a schematic view of an entire lens system in which the anti-vibration lens system 13 shown in FIG. 6 is combined with the master lens 20. Table 3 below shows numerical data of the anti-vibration lens system 13 shown in FIG. 6. The glass cover C of the CCD 31 in FIG. 8 is not shown in FIG. 6; however, the surface Nos. 19 and 20 in Table 3 correspond to the opposite surfaces of the glass cover C.

The anti-vibration lens system 13 in the second embodiment constitutes seven positive lens elements and three negative lens elements. The front lens group 13-1 constitutes four positive lens elements and two negative lens elements. The rear lens group 13-2 includes three positive lens elements and one negative lens element. The frontmost lens closest to the object (master lens 20), hatched in FIG. 6 defines a correction lens group 11 which is movable in a direction perpendicular to the optical axis. The mean refractive index of the positive lens elements is 1.73326. Among the positive lens elements, five positive lens elements have a refractive index greater than 1.7. There are two lens elements whose refractive index "n" and Abbe number ν are greater than 1.6 (n>1.6) and 60 (ν>60), respectively. The sensitivity K of the correction lens group 11 is 0.51.

TABLE 3

| $F_{NO} = 1:2.0$ | f = −102.60 | m = −1.265 | fB = 20.58 |
|---|---|---|---|
| Surface No. | R | D | Nd | νd |
| 1 | 108.765 | 5.000 | 1.83481 | 42.7 |
| 2 | −30.000 | 2.873 | — | — |
| 3 | 15.842 | 4.194 | 1.77250 | 49.6 |
| 4 | −60.915 | 1.100 | 1.63980 | 34.5 |
| 5 | 11.218 | 6.398 | — | — |
| 6 | −8.402 | 2.441 | 1.71736 | 29.5 |
| 7 | −844.136 | 6.418 | 1.61800 | 63.4 |
| 8 | −13.682 | 1.000 | — | — |
| 9 | −272.821 | 4.345 | 1.80400 | 46.6 |
| 10 | −27.855 | 1.000 | — | — |
| Diaphragm | ∞ | 0.000 | — | — |
| 11 | 30.808 | 7.850 | 1.77250 | 49.6 |
| 12 | 209.807 | 15.658 | — | — |
| 13 | −28.609 | 4.300 | 1.84666 | 23.8 |
| 14 | 25.243 | 8.252 | — | — |
| 15 | 129.244 | 7.200 | 1.61800 | 63.4 |
| 16 | −23.629 | 0.761 | — | — |
| 17 | 26.758 | 7.400 | 1.71300 | 53.9 |
| 18 | 202.322 | 0.000 | — | — |
| 19 | ∞ | 3.500 | 1.51633 | 64.1 |
| 20 | ∞ | — | — | — |

<Embodiment 3>

Figure 9:
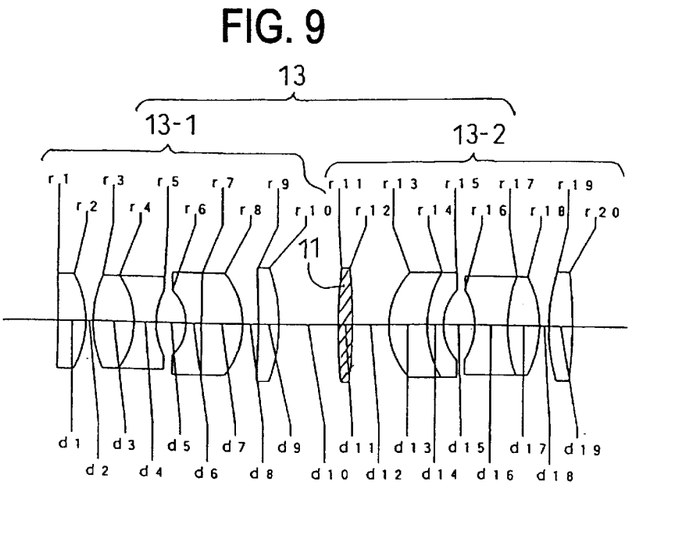
FIG. 9 is a schematic view of a lens arrangement of an anti-vibration lens attachment according to a third embodiment of the present invention.
Figure 10A:
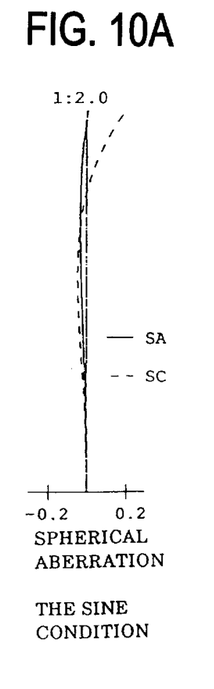
FIGS. 10A, 10B, 10C and 10D show aberration diagrams of a lens system shown in FIG. 9.
Figure 10B:
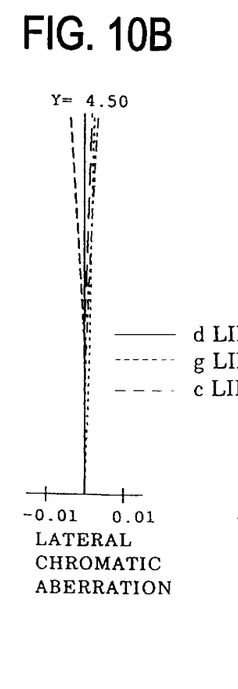
Figure 10C:
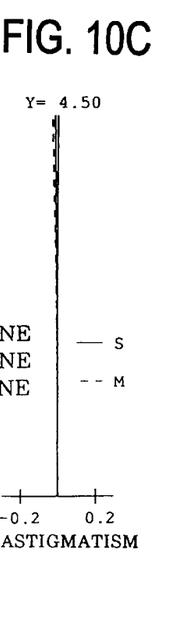
Figure 10D:
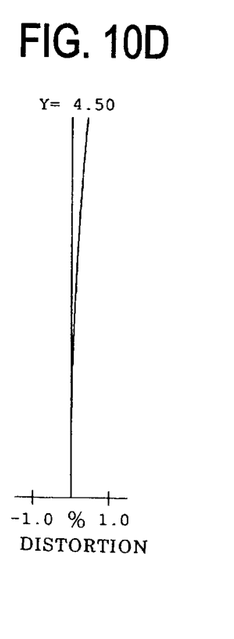
Figure 11:
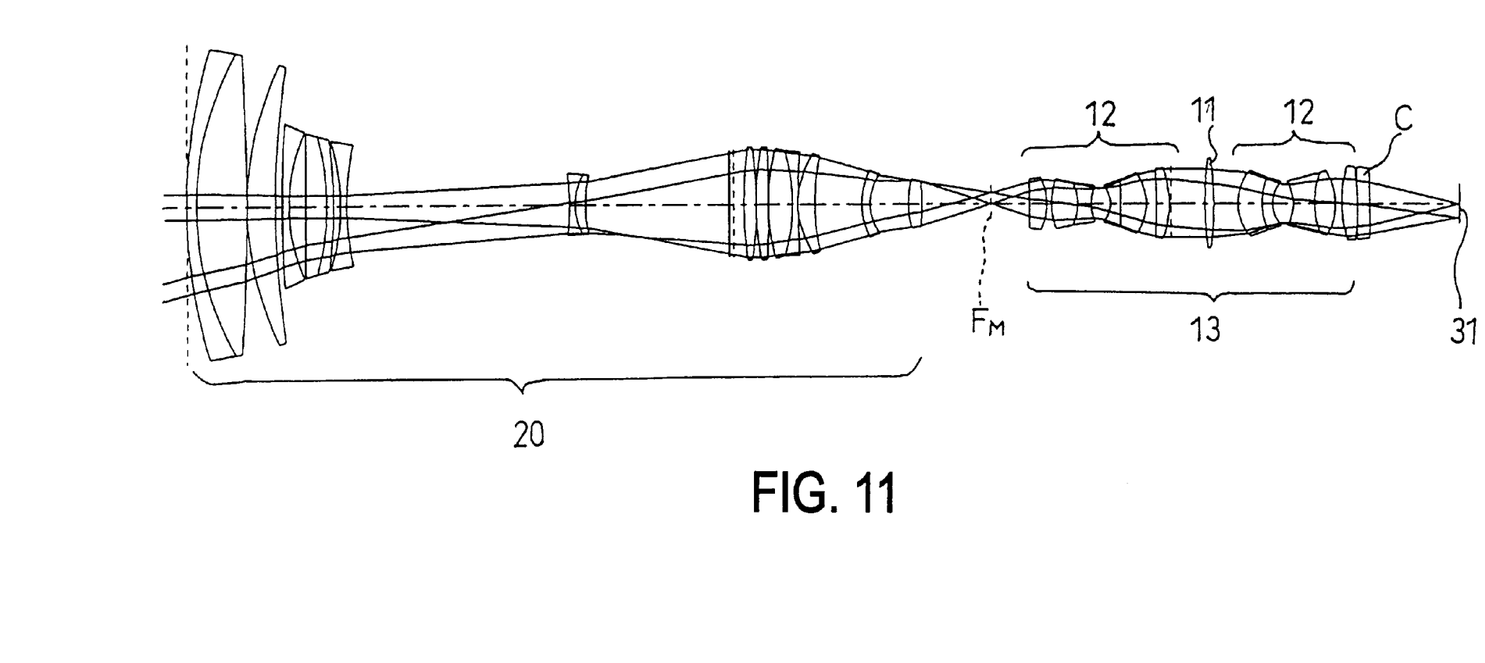
FIG. 11 is a schematic view of an entire lens system including a vibration lens attachment shown in FIG. 9 and a master lens, in combination.

FIG. 9 shows a lens arrangement of a third embodiment of an anti-vibration system 13 of an anti-vibration lens attachment according to the present invention. FIGS. 10A through 10D show aberration diagrams of the anti-vibration lens system 13 shown in FIG. 9; and FIG. 11 is a schematic view of a whole lens system in which the anti-vibration lens system 13 shown in FIG. 9 is combined with the master lens 20. Table 4 below shows numerical data of the anti vibration lens system 13 shown in FIG. 9. The glass cover C of the CCD 31 in FIG. 11 is not shown in FIG. 9, but the surface Nos. 21 and 22 in Table 4 correspond to the opposite surfaces of the glass cover.

The anti-vibration lens system 13 in the third embodiment constitutes eight positive lens elements and four negative lens elements. The front lens group 13-1 and the rear lens group 13-2 each have four positive lens elements and two negative lens elements. The frontmost lens of the rear lens group 13-2 closest to the object (master lens 20), hatched in FIG. 9, defines a correction lens group 11 which is movable in a direction perpendicular to the optical axis. The mean refractive index of the positive lens elements is 1.68899. Among the positive lens elements, three positive lens elements have a refractive index greater than 1.7. There are three lens elements whose refractive index "n" and Abbe number ν are greater than 1.6 (n>1.6) and 60 (ν>60), respectively. The sensitivity K of the correction lens group 11 is 0.40.

TABLE 4

| $F_{NO} = 1:2.0$ | f = −53.66 | m = −1.270 | fB = 25.07 |
|---|---|---|---|
| Surface No. | R | D | Nd | νd |
| 1 | −262.604 | 5.000 | 1.83481 | 42.7 |
| 2 | −18.282 | 1.376 | — | — |

TABLE 4-continued $F_{NO} = 1:2.0$  $f = -53.66$  $m = -1.270$  $fB = 25.07$

| Surface No. | R | D | Nd | νd |
|---|---|---|---|---|
| 3 | 20.743 | 7.660 | 1.69680 | 55.5 |
| 4 | −14.308 | 3.987 | 1.63980 | 34.5 |
| 5 | 13.256 | 5.449 | — | — |
| 6 | −8.174 | 2.784 | 1.68893 | 31.1 |
| 7 | 335.476 | 7.468 | 1.61800 | 63.4 |
| 8 | −15.050 | 2.818 | — | — |
| 9 | −189.757 | 3.779 | 1.80400 | 46.6 |
| 10 | −29.930 | 0.500 | — | — |
| Diaphragm | ∞ | 10.000 | — | — |
| 11 | 100.000 | 2.600 | 1.48749 | 70.2 |
| 12 | −100.000 | 6.843 | — | — |
| 13 | 14.208 | 7.000 | 1.61800 | 63.4 |
| 14 | 18.989 | 3.000 | 1.53172 | 48.9 |
| 15 | 9.251 | 5.872 | — | — |
| 16 | −12.150 | 6.000 | 1.69895 | 30.1 |
| 17 | 26.622 | 5.888 | 1.61800 | 63.4 |
| 18 | −18.921 | 1.678 | — | — |
| 19 | 35.122 | 4.339 | 1.83481 | 42.7 |
| 20 | −80.998 | 0.000 | — | — |
| 21 | ∞ | 3.5 | 1.51633 | 64.1 |
| 22 | ∞ | — | — | — |

<Embodiment 4>

Figure 12:
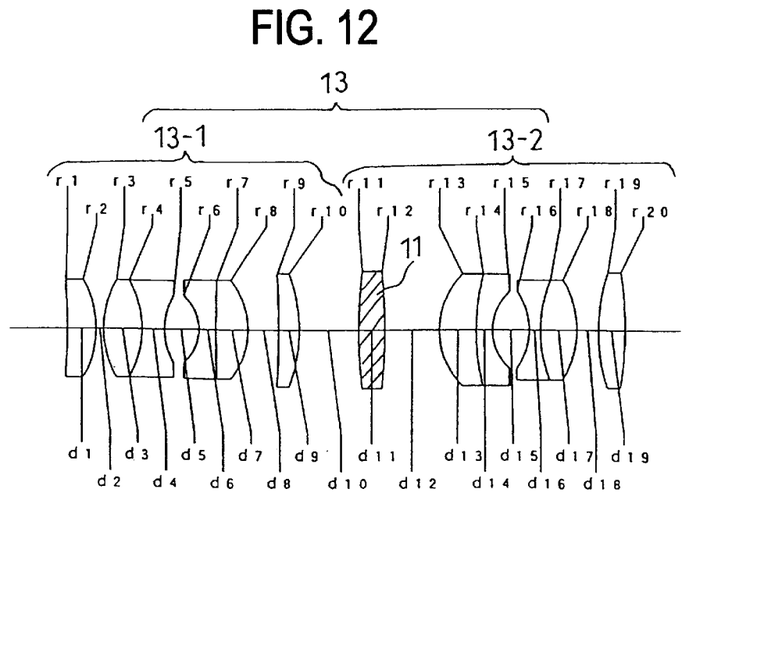
FIG. 12 is a schematic view of a lens arrangement of an anti-vibration lens attachment according to a fourth embodiment of the present invention.
Figure 13A:
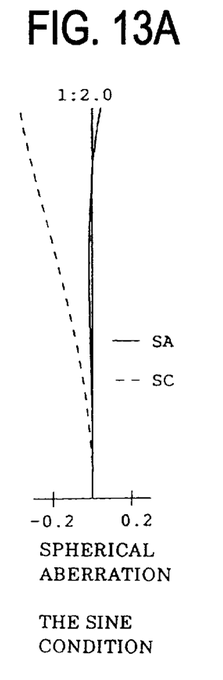
FIGS. 13A, 13B, 13C and 13D show aberration diagrams of a lens system shown in FIG. 12.
Figures 13B, 13C:
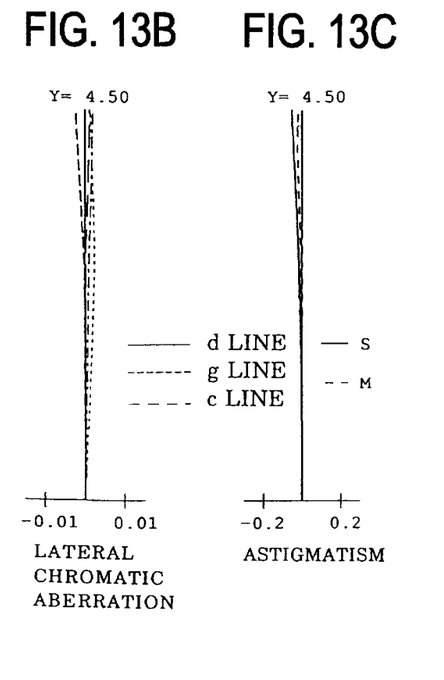
Figure 13D:
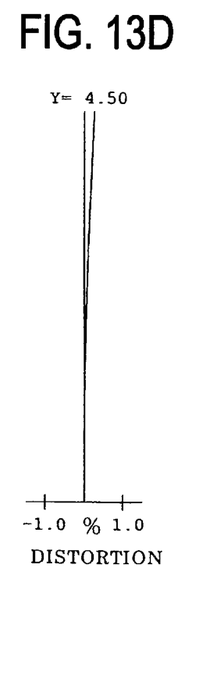
Figure 14:
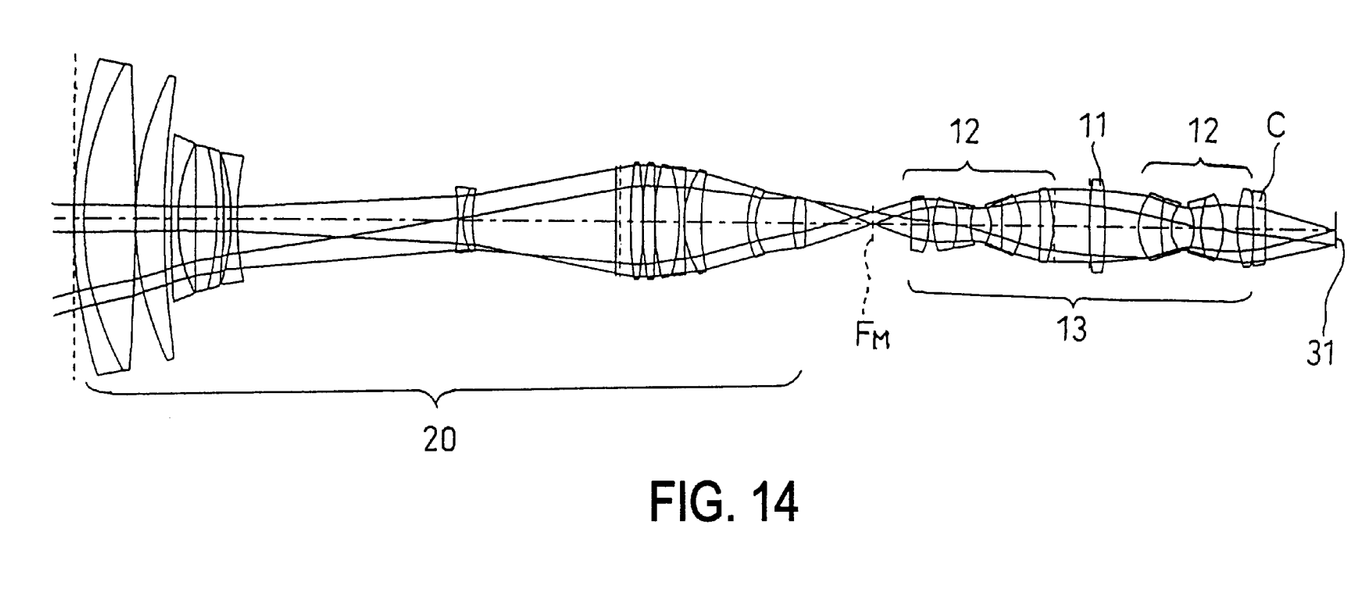
FIG. 14 is a schematic view of an entire lens system including a vibration lens attachment shown in FIG. 12 and a master lens, in combination.

FIG. 12 shows a lens arrangement of a fourth embodiment of an anti-vibration system 13 of an anti-vibration lens attachment according to the present invention. FIGS. 13A through 13D show aberration diagrams of the anti-vibration lens system 13 shown in FIG. 12; and FIG. 14 is a schematic view of an entire lens system in which the anti-vibration lens system 13 shown in FIG. 12 is combined with the master lens 20. Table 5 below shows numerical data of the anti-vibration lens system 13 shown in FIG. 12. The glass cover C of the CCD 31 in FIG. 14 is not shown in FIG. 12, but the surface Nos. 21 and 22 in Table 5 correspond to the opposite surfaces of the glass cover.

The anti-vibration lens system 13 in the fourth embodiment constitutes eight positive lens elements and four negative lens elements. The front lens group 13-1 and the rear lens group 13-2 are each comprised of four positive lens elements and two negative lens elements. The frontmost lens of the rear lens group 13-2 closest to the object (master lens 20), hatched in FIG. 12 defines a (correction lens group 11 which is movable in a direction perpendicular to the optical axis. The correction lens group 11 is made of a plastic lens. The mean refractive index of the positive lens elements is 1.68952. Among the positive lens elements, three positive lens elements have a refractive index greater than 1.7. There are three lens elements whose refractive index "n" and Abbe number ν are greater than 1.6 (n>1.6) and 60 (ν>60), respectively. The sensitivity K of the correction lens group 11 is 0.40.

TABLE 5

$F_{NO} = 1:2.0$  $f = -37.84$  $m = -1.241$  $fB = 20.55$

| Surface No. | R | D | Nd | νd |
|---|---|---|---|---|
| 1 | −127.164 | 5.000 | 1.83481 | 42.7 |
| 2 | −17.929 | 1.350 | — | — |
| 3 | 17.608 | 6.840 | 1.69680 | 55.5 |
| 4 | −17.608 | 4.000 | 1.63980 | 34.5 |
| 5 | 11.970 | 6.000 | — | — |
| 6 | −8.190 | 3.000 | 1.68893 | 31.1 |
| 7 | 260.000 | 5.700 | 1.61800 | 63.4 |
| 8 | −14.120 | 5.420 | — | — |

TABLE 5-continued $F_{NO} = 1:2.0$  $f = -37.84$  $m = -1.241$  $fB = 20.55$

| Surface No. | R | D | Nd | νd |
|---|---|---|---|---|
| 9 | −139.993 | 3.630 | 1.80400 | 46.6 |
| 10 | −28.608 | 0.500 | — | — |
| Diaphragm | ∞ | 10.000 | — | — |
| 11 | 91.023 | 4.500 | 1.49176 | 57.4 |
| 12 | −108.950 | 9.749 | — | — |
| 13 | 14.282 | 6.500 | 1.61800 | 63.4 |
| 14 | 39.361 | 3.000 | 1.53172 | 48.9 |
| 15 | 9.290 | 6.556 | — | — |
| 16 | −12.024 | 2.000 | 1.69895 | 30.1 |
| 17 | 23.167 | 6.558 | 1.61800 | 63.4 |
| 18 | −17.042 | 3.948 | — | — |
| 19 | 33.216 | 4.782 | 1.83481 | 42.7 |
| 20 | −70.538 | 0.000 | — | — |
| 21 | ∞ | 3.500 | 1.51633 | 64.1 |
| 22 | ∞ | — | — | — |

<Embodiment 5>

Figure 15:
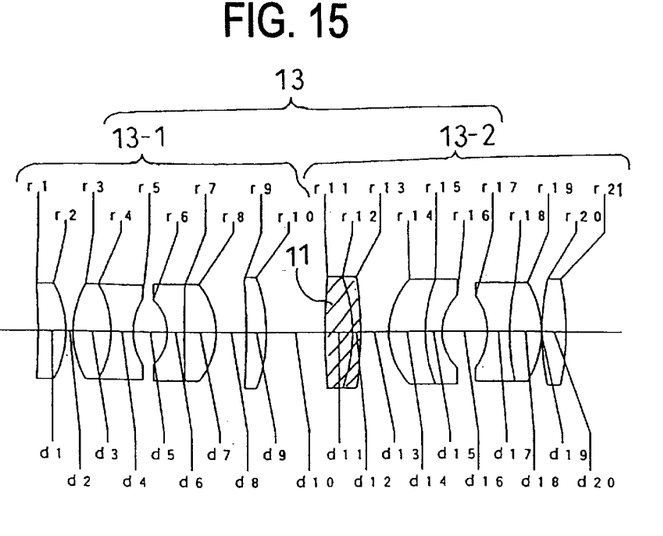
FIG. 15 is a schematic view of a lens arrangement of an anti-vibration lens attachment according to a fifth embodiment of the present invention.
Figure 16A:
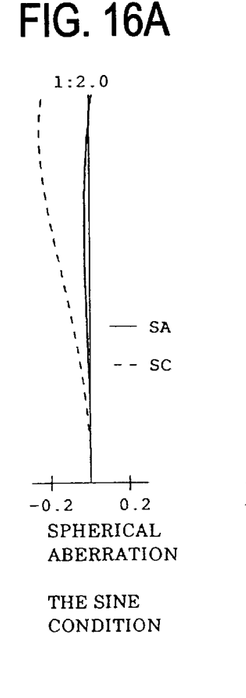
FIGS. 16A, 16B, 16C and 16D show aberration diagrams of a lens system shown in FIG. 15.
Figures 16B, 16C:
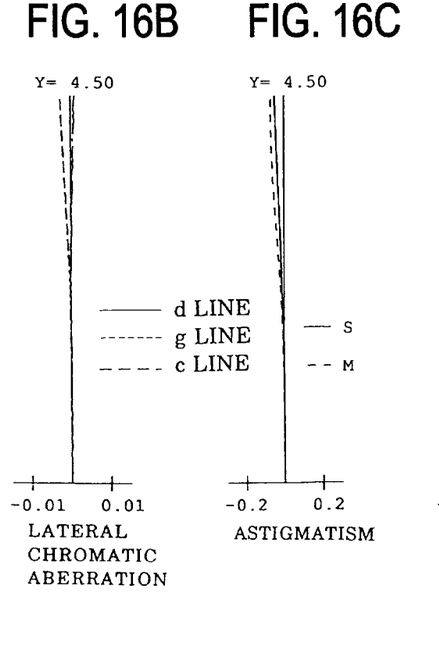
Figure 16D:
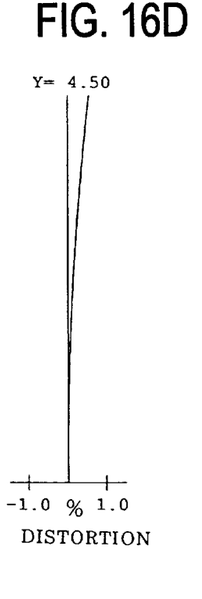
Figure 17:
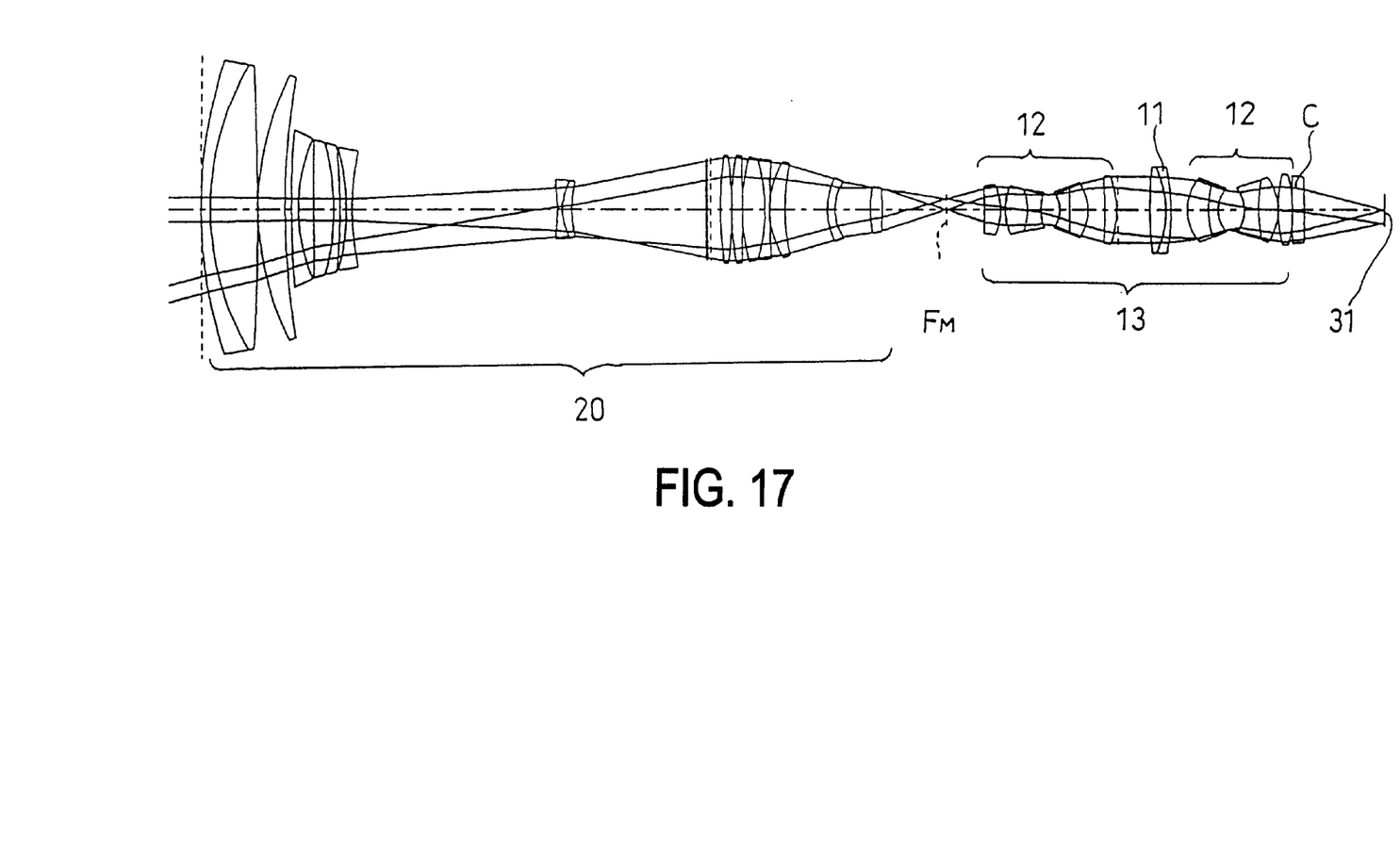
FIG. 17 is a schematic view of an entire lens system including a vibration lens attachment shown in FIG. 15 and a master lens, in combination.

FIG. 15 shows a lens arrangement of a fifth embodiment of an anti-vibration system 13 of an anti-vibration lens attachment according to the present invention. FIGS. 16A through 16D show aberration diagrams of the anti-vibration lens system 13 shown in FIG. 15. FIG. 17 is a schematic view of an entire lens system in which the anti-vibration lens system 13 shown in FIG. 15 is combined with the master lens 20. Table 6 below shows numerical data of the anti-vibration lens system 13 shown in FIG. 15. The class C of the CCD 31 in FIG. 17 is not shown in FIG. 15, but the surface Nos. 22 and 23 in Table 6 correspond to the opposite surfaces of the glass cover C.

The anti-vibration lens system 13 in the fifth embodiment constitutes eight positive lens elements and five negative lens elements. The front lens croup 13-1 constitutes four positive lens elements and two negative lens elements. The rear lens group 13-2 constitutes four positive lens elements and three negative lens elements. The frontmost cemented lens of the rear lens group 13-2 constitutes a positive lens element and a negative lens element cemented thereto and is located closest to the object (master lens 20), hatched in FIG. 15 defines a correction lens group 11 which is movable in a direction perpendicular to the optical axis. The mean refractive index of the positive lens elements is 1.68899. Among the positive lens elements, three positive lens elements have a refractive index greater than 1.7. There are three lens elements whose refractive index "n" and Abbe number ν are greater than 1.6 (n>1.6) and 60 (ν>60), respectively. The sensitivity K of the correction lens group 11 is 0.40.

TABLE 6

$F_{NO} = 1:2.0$  $f = -48.19$  $m = -1.257$  $fB = 24.34$

| Surface No. | R | D | Nd | νd |
|---|---|---|---|---|
| 1 | −127.164 | 5.000 | 1.83481 | 42.7 |
| 2 | −17.929 | 1.350 | — | — |
| 3 | 17.608 | 6.840 | 1.69680 | 55.5 |
| 4 | −17.608 | 4.000 | 1.63980 | 34.5 |
| 5 | 11.970 | 6.000 | — | — |
| 6 | −8.190 | 3.000 | 1.68893 | 31.1 |
| 7 | 260.000 | 5.700 | 1.61800 | 63.4 |
| 8 | −14.120 | 5.420 | — | — |
| 9 | −139.993 | 3.630 | 1.80400 | 46.6 |
| 10 | −28.608 | 0.500 | — | — |
| Diaphragm | ∞ | 10.000 | — | — |
| 11 | 117.000 | 5.000 | 1.48749 | 70.2 |
| 12 | −28.360 | 1.500 | 1.56883 | 56.3 |

TABLE 6-continued $F_{NO} = 1:2.0$  $f = -48.19$  $m = -1.257$  $fB = 24.34$

| Surface No. | R | D | Nd | νd |
|---|---|---|---|---|
| 13 | −65.867 | 5.060 | — | — |
| 14 | 14.120 | 6.500 | 1.61800 | 63.4 |
| 15 | 25.647 | 3.000 | 1.53172 | 48.9 |
| 16 | 9.200 | 8.040 | — | — |
| 17 | −11.050 | 4.000 | 1.69895 | 30.1 |
| 18 | 43.733 | 5.700 | 1.61800 | 63.4 |
| 19 | −17.179 | 0.100 | — | — |
| 20 | 46.580 | 4.290 | 1.83481 | 42.7 |
| 21 | −46.580 | 0.000 | — | — |
| 22 | ∞ | 3.500 | 1.51633 | 64.1 |
| 23 | ∞ | — | — | — |

As noted above, "K" is a ratio of the displacement of the image to the displacement of the correction lens group. As an example, in the third to fifth embodiments of the present invention, as disclosed above, when the lens displacement is 1 mm, the image displacement is 0.4 mm and K is therefore 0.4/1.0=0.4. Values of "K" for the first and second embodiments of the present invention can be obtained in an analogous fashion. Of course, it is understood that the above-mentioned values are merely illustrative examples and that any values can be utilized if the condition is satisfied. Generally speaking however a range of the lens/image displacement is in the vicinity of several millimeters.

As mentioned above, a mechanism for moving the correction lens group 11 of the anti-vibration lens system 13 in a direction perpendicular to the optical axis, an element or mechanism for detecting the vibration applied to the camera, and an algorithm for moving the correction lens group in accordance with the detected vibration; are per se known, and are not the subject of the present invention.

As may be understood from the above discussion, according to the present invention, in an anti-vibration lens attachment which can be inserted and attached between a photographing lens system and a camera body, freedom of design of the anti-vibration lens system can be increased, an optional magnification can be set, and optical properties can be enhanced.

What is claimed is:

1. An anti-vibration lens attachment which is detachably attachable to, and between, a photographing lens system and a camera body, said anti-vibration lens attachment comprising:
   an anti-vibration lens system having at least one correction lens group, said at least one correction lens group being movable in a direction perpendicular to an optical axis, said photographing lens system and said anti-vibration lens system being positioned such that an image formed by said photographing lens system is formed again on an image forming surface of the camera body by said anti-vibration lens system; and
   said anti-vibration lens system comprising at least six positive lens elements and at least two negative lens elements,
   wherein said at least six positive lens elements and said at least two negative lens elements are divided into front and rear lens groups at a portion at which an inclination of paraxial rays with respect to the optical axis is minimal, each of said front and rear lens groups comprising at least three positive lens elements and at least one negative lens element, respectively.

2. An anti-vibration lens attachment according to claim 1, wherein the mean value of refractive indexes of said positive lens elements is larger than 1.65.

3. An anti-vibration lens attachment according to claim 1, wherein a lens group located closest to said photographing lens system in said front lens group comprises said correction lens group.

4. An anti-vibration lens attachment according to claim 1, wherein a lens group located closest to said photographing lens system in said rear lens group comprises said correction lens group.

5. An anti-vibration lens attachment according to claim 1, wherein aberrations are independently corrected by said front and rear lens groups.

6. An anti-vibration lens attachment according to claim 1, wherein said anti-vibration lens system is comprised of at least seven positive lens elements and at least three negative lens elements.

7. An anti-vibration lens attachment according to claim 3, wherein at least three lens elements of said seven positive lens elements have a refractive index greater than 1.7.

8. An anti-vibration lens attachment according to claim 6, wherein said at least seven positive lens elements and said at least three negative lens elements are divided into front and rear lens groups at a portion in which an inclination of paraxial rays with respect to the optical axis is minimal, each of said front lens group comprising at least four positive lens elements and at least two negative lens elements, said rear lens group comprising at least three positive lens elements and at least one negative lens element.

9. An anti-vibration lens attachment according to claim 8, wherein a lens group located closest to said photographing lens system in said front lens group comprises said correction lens group.

10. An anti-vibration lens attachment according to claim 8, wherein a lens group located closest to said photographing lens system in said rear lens group comprises said correction lens group.

11. An anti-vibration lens attachment according to claim 8, wherein aberrations are independently corrected by said front and rear lens groups.

12. An anti-vibration lens attachment according to claim 6, wherein said anti-vibration lens system includes at least two lens elements whose refractive index "n" and dispersive power "ν" are greater than 1.6 (n>1.6) and 60 (ν>60), respectively.

13. An anti-vibration lens attachment according to claim 1, wherein said correction lens group comprises a plastic lens.

14. An anti-vibration lens attachment which is detachably attachable to, and between, a photographing lens system and a camera body, said anti-vibration lens attachment comprising:
   an anti-vibration lens system having at least one correction lens group, said at least one correction lens group being movable in a direction perpendicular to an optical axis, said photographing lens system and said anti-vibration lens system being positioned such that an image formed by said photographing lens system is formed again on an image forming surface of the camera body by said anti-vibration lens system; and
   said anti-vibration lens system comprising at least six positive lens elements and at least two negative lens elements,
   wherein the sensitivity of said correction lens group in said anti-vibration lens system satisfies the following condition:

$$0.2 < |K| < 0.8;$$

wherein K=(displacement of the image formed through the anti-vibration lens system on the image forming surface)/(displacement of the correction lens group in a direction perpendicular to the optical axis).

15. The anti-vibration lens attachment according to claim 14, wherein the mean value of refractive indexes of said positive lens elements is larger than 1.65.

16. The anti-vibration lens attachment according to claim 14, wherein said correction lens group comprises a plastic lens.

17. The anti-vibration lens attachment according to claim 14, said at least six positive lens elements and said at least two negative lens elements being divided into front and rear lens groups, and aberrations are independently corrected by said front lens group and by said rear lens group.

18. The anti-vibration lens attachment according to claim 14, said at least six positive lens elements and said at least two negative lens elements being divided into front and rear lens groups, and a lens group located closest to said photographing lens system in said front lens group comprises said correction lens group.

19. The anti-vibration lens attachment according to claim 14, said at least six positive lens elements and said at least two negative lens elements being divided into front and rear lens groups, and a lens group located closest to said photographing lens system in said rear lens group comprises said correction lens group.

20. The anti-vibration lens attachment according to claim 14, said anti-vibration lens system comprises at least seven positive lens elements and at least three negative lens elements.

* * * * *